(12) United States Patent
Chui et al.

(10) Patent No.: US 8,797,012 B1
(45) Date of Patent: Aug. 5, 2014

(54) HYSTERETIC REGULATOR WITH OUTPUT SLOPE DETECTION

(71) Applicant: Marvell International Ltd., Hamilton (BM)

(72) Inventors: Siew Yong Chui, Singapore (SG); Rudy Kurniawan, Singapore (SG); Jye Sheng Hong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/745,435

(22) Filed: Jan. 18, 2013

Related U.S. Application Data

(63) Continuation of application No. 12/779,743, filed on May 13, 2010, now Pat. No. 8,358,117.

(60) Provisional application No. 61/178,274, filed on May 14, 2009.

(51) Int. Cl.
  *G05F 1/00* (2006.01)
(52) U.S. Cl.
  USPC .......................................... 323/284

(58) Field of Classification Search
  USPC ................. 323/234, 237, 265, 273–275, 282, 323/284–285
  See application file for complete search history.

(56) References Cited

U.S. PATENT DOCUMENTS

| | | | |
|---|---|---|---|
| 7,515,441 B2 * | 4/2009 | Kashima | 363/21.01 |
| 7,615,973 B2 | 11/2009 | Uehara | |
| 7,679,348 B2 | 3/2010 | Sohma | |
| 2002/0141213 A1 * | 10/2002 | De Vries | 363/124 |
| 2004/0076026 A1 * | 4/2004 | Dinh et al. | 363/62 |
| 2009/0278516 A1 * | 11/2009 | Bhagwat et al. | 323/270 |
| 2009/0322303 A1 * | 12/2009 | Hirata et al. | 323/284 |

* cited by examiner

*Primary Examiner* — Adolf Berhane
*Assistant Examiner* — Jeffrey Gblende

(57) ABSTRACT

In one embodiment, an apparatus includes output voltage comparison circuitry that compares an output voltage of a regulator and a reference voltage and outputs an output voltage comparison signal based on the comparison. Slope detection circuitry detects a slope of the output voltage and outputs a slope comparison signal based on the slope detected. Duty cycle determination circuitry receives the output voltage comparison signal and the slope comparison signal and outputs a pre-driver signal having a duty cycle based on the output voltage comparison signal and the slope comparison signal. The pre-driver signal is used to regulate the output voltage of the voltage regulator.

16 Claims, 9 Drawing Sheets

350

| Compout | Compout_slope | CLK_PRE |
|---|---|---|
| 0 (Vout>Vref) 352 | 0 (negative) 354 | DC2 356 |
| | 1 (positive) 358 | DC1 360 |
| 1 (Vout<Vref) 362 | 0 (negative) 364 | DC4 366 |
| | 1 (positive) 368 | DC3 370 |

Fig. 3b

HYSTERETIC REGULATOR WITH OUTPUT SLOPE DETECTION

CROSS REFERENCE TO RELATED APPLICATIONS

The present disclosure is a continuation of and claims priority to U.S. patent application Ser. No. 12/779,743, filed May 13, 2010, now U.S. Pat. No. 8,358,117, issued Jan. 22, 2013, which claims priority to U.S. Provisional Application No. 61/178,274, filed May 14, 2009, which are incorporated herein by reference.

BACKGROUND

Particular embodiments generally relate to regulators for conversion of voltages.

Unless otherwise indicated herein, the approaches described in this section are not prior art to the claims in this application and are not admitted to be prior art by inclusion in this section.

Regulators, such as buck regulators, may be used to generate a lower direct current (DC) voltage from a higher DC voltage. For example, FIG. 1 depicts an example of a conventional buck regulator. The buck regulator includes an inductor 104, a capacitor 106, and a load 108. Switches 102a and 102b may be opened and closed to either charge inductor current or discharge inductor current. For example, when switch 102a is closed and switch 102b is open, input supply is applied across the inductor 104 to charge the current. Also, when switch 102a is open and switch 102b is closed, the voltage polarity across inductor 104 is reversed and the current is discharged. The inductor current is distributed between capacitor 106 and load 108.

An input supply voltage is applied across inductor 104 to charge the inductor current when the output voltage (Vout) is below a reference voltage (Vref). When the inductor current is higher than the load current, the excess current charges capacitor 106 causing the output voltage to rise towards the reference voltage. When the output voltage goes above the reference voltage, the voltage polarity across inductor 104 is reversed and the inductor current decays. When the inductor current is lower than the load current, the deficit current is supplied from capacitor 106 causing the output voltage to decrease towards the reference voltage.

A control system may be used to determine when to open and close switches 102a and 102b. The output voltage is compared to the reference voltage at a comparator 110. In one example, if the output voltage is above the reference voltage, comparator 110 outputs a low logic value (e.g., '0') and if the output voltage is below the reference voltage, comparator 110 outputs a high logic value (e.g., '1'). A flip-flop 112, such as a D flip-flop, receives the comparator output signal, Compout. When clocked using a clock signal CLKIN, flip-flop 112 outputs the comparator output signal to a selector 114.

Selector 114 receives two signals DC1 and DC2 with different duty cycles, a duty cycle DC1 and a duty cycle DC2. The duty cycle DC1 has a duty cycle that is less than the duty cycle DC2. Depending on the value of the comparator output received at S0, either signal DC1 or signal DC2 is selected and output to a pre-driver 116. For example, if the comparator output signal is '0', signal DC1 is selected, and if the comparator output signal is '1', the signal DC2 is selected. Thus, the duty cycle is higher when the output voltage is above the reference voltage and the duty cycle is lower when the output voltage is below the reference voltage.

Depending on the duty cycle of the signal, pre-driver 116 controls switches 102a and 102b differently. The duty cycle of signals DC1 and DC2 determines how much current is either charged or discharged from/to inductor 104 for a percentage of time. For example, when the signals DC1 and DC2 are high, switch 102a is closed and switch 102b is open, and when the signals DC1 and DC2 are low, switch 102a is open and switch 102b is closed. However, since DC2 has a higher duty cycle than DC1, the time signal DC2 is high is greater than the time signal DC1 is high. Thus, switch 102a is closed longer when DC2 is input to pre-driver 116 than when DC1 is provided to pre-driver 116.

The output voltage may include what is sometimes referred to as a ripple. Ripple is systematic fluctuations in the output voltage over time. Ripple may be caused by two factors: a phase lag between a current through inductor 104 and the resulting output voltage or as a consequence of a nonzero value of an equivalent series resistance (ESR) of capacitor 106 or an additional external ESR added in series with capacitor 106. A larger value for the ESR reduces the phase lag. However, the larger value for the ESR increases the ripple in the output voltage. Also, when the ESR value is reduced to zero, a maximum phase lag occurs, which increases the ripple in the output voltage.

A designer should choose the value of the ESR to maximize performance. However, the control is included on an integrated circuit (IC) chip while capacitor 106 is external to the IC (e.g., off chip). Thus, a designer of the control may not be able to control what value of the ESR inherent to capacitor 106 or added in series to capacitor 106. This may reduce the performance of the regulator because the value for the ESR is not within the control of the designer and may not be optimized for maximum performance.

SUMMARY

In one embodiment, an apparatus includes output voltage comparison circuitry that compares an output voltage of a regulator to a reference voltage and outputs an output voltage comparison signal based on the comparison. Slope detection circuitry detects a slope of the output voltage and outputs a slope comparison signal based on the slope detected. Duty cycle determination circuitry receives the output voltage comparison signal and the slope comparison signal and outputs a pre-driver signal having a duty cycle based on the output voltage comparison signal and the slope comparison signal. The pre-driver signal is used to regulate the output voltage of the voltage regulator.

In one embodiment, the duty cycle determination circuitry comprises a selector. The selector comprises: a first terminal receiving the output voltage comparison signal; and a second terminal receiving the slope comparison signal, wherein the selector selects the pre-driver signal with the duty cycle from plurality of pre-driver signals based on a first value received at the first terminal and a second value received at the second terminal.

In one embodiment, the plurality of duty cycles comprise a first duty cycle, a second duty cycle, a third duty cycle, and a fourth duty cycle, wherein the first duty cycle is selected when the output voltage is greater than the reference voltage and the slope is positive, the second duty cycle is selected when the output voltage is greater than the reference voltage and the slope is negative, the third duty cycle is selected when the output voltage is less than the reference voltage and the slope is positive, and the fourth duty cycle is selected when the output voltage is less than the reference voltage and the slope is negative.

In one embodiment, the apparatus further comprises: a first switch; and a second switch, wherein input power is transferred to the inductor when the first switch is closed and the second switch is opened, and wherein power is drawn from the inductor to the load when the first switch opened and the second switch is closed.

In another embodiment, a system comprises the apparatus, wherein the regulator comprises: an inductor; and a capacitor, wherein power is supplied to the inductor to charge the capacitor when the output voltage is below the reference voltage and power is drawn from the inductor to discharge the capacitor when the output voltage is greater than the reference voltage.

In another embodiment, a method comprises: comparing an output voltage waveform of a regulator to a reference voltage to determine an output voltage comparison signal; determining a slope for the output voltage waveform to determine a slope comparison signal; selecting a duty cycle for a pre-driver signal based on the output voltage comparison signal and the slope comparison signal; and regulating the output voltage of the regulator based on the duty cycle for the pre-driver signal.

In one embodiment, determining the duty cycle comprises selecting the duty cycle from a plurality of duty cycles.

In one embodiment, the plurality of duty cycles comprise a first duty cycle, a second duty cycle, a third duty cycle, and a fourth duty cycle, wherein: the fourth duty cycle is greater than the third duty cycle; the third duty cycle is greater than the second duty cycle; the second duty cycle is greater than the first duty cycle; and the first duty cycle is greater or equal to zero.

In one embodiment, the plurality of duty cycles comprise a first duty cycle, a second duty cycle, a third duty cycle, and a fourth duty cycle, wherein determining the duty cycle comprises: selecting the first duty cycle when the output voltage is greater than the reference voltage and the slope is positive; selecting the second duty cycle when the output voltage is greater than the reference voltage and the slope is negative; selecting the third duty cycle when the output voltage is less than the reference voltage and the slope is positive; and selecting the fourth duty cycle when the output voltage is less than the reference voltage and the slope is negative.

The following detailed description and accompanying drawings provide a detailed understanding of the nature and advantages of the present invention.

BRIEF DESCRIPTION OF THE DRAWINGS

FIG. 3b shows a table summarizing the values of signals of FIG. 3 according to one embodiment.

DETAILED DESCRIPTION

Described herein are techniques for a regulator. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 2:
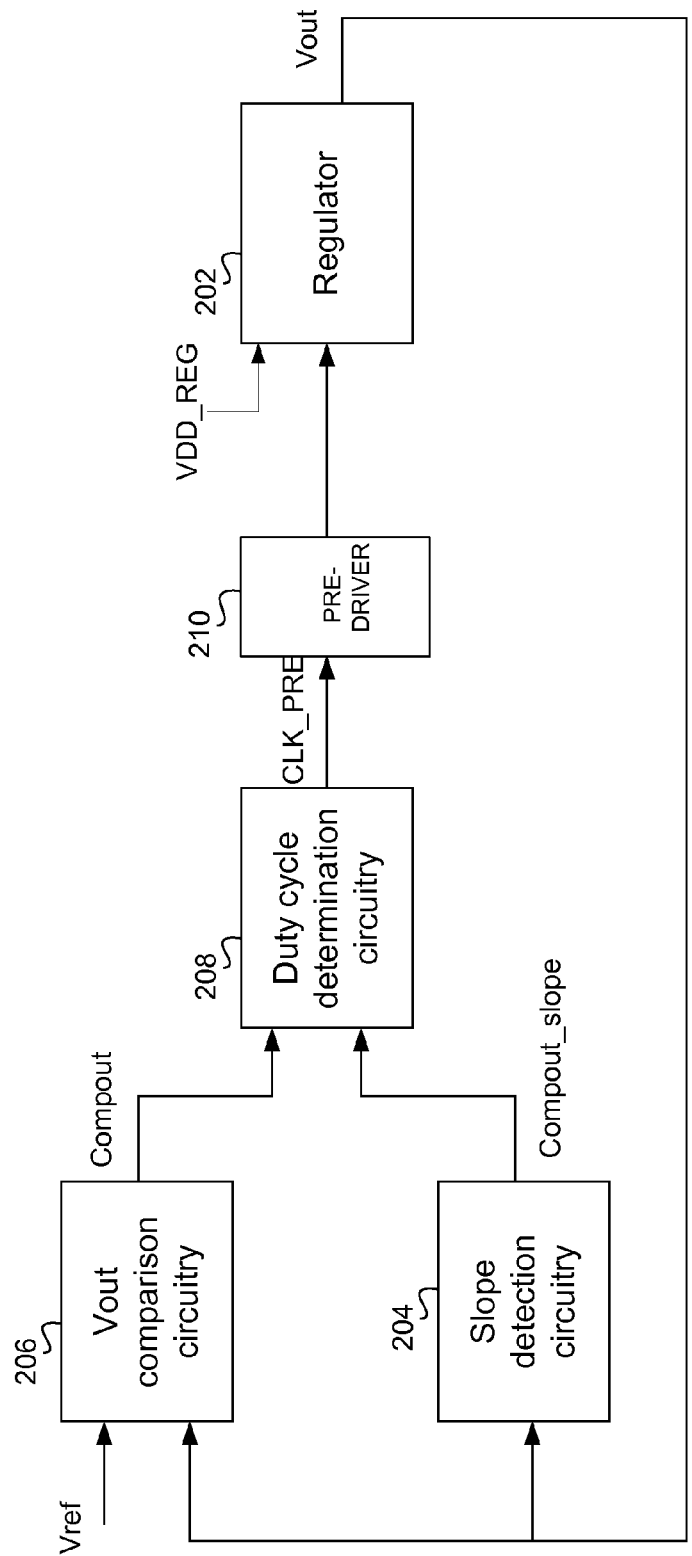
FIG. 2 depicts an example of a system for a hysteretic regulator according to one embodiment.

FIG. 2 depicts an example of a system 200 for a hysteretic regulator according to one embodiment. A regulator 202 is used to convert a supply voltage (VDD_REG) to another voltage. For example, regulator 202 may be a buck regulator that performs a direct current (DC) to DC voltage conversion. Other regulators that perform a voltage conversion may also be provided.

Hysteretic control is provided by system 200. The hysteretic control maintains an output voltage (Vout) of regulator 202 within a band around a reference voltage. The control reduces fluctuations (ripples) on the output voltage and the current through an inductor (not shown) of regulator 202 that may occur when current through a load (not shown) is switched. Particular embodiments use slope detection of the output voltage to determine a duty cycle for a signal used to regulate the output voltage of regulator 202. In one embodiment, four duty cycles are used to reduce the ripples of the output voltage and inductor current.

Slope detection circuitry 204 detects a slope of the output voltage. Different methods may be used to detect the slope as will be discussed below. Slope detection circuitry 204 outputs a slope comparison signal Compout_slope. In one embodiment, the slope comparison signal may be a logic low level or logic high level depending on the slope. For example, if the slope is negative, a logic low level may be output, and if the slope is positive, a logic high level may be output.

Vout comparison circuitry 206 is used to compare the output voltage of regulator 202 to a reference voltage Vref. The reference voltage may be based on a desired voltage level for the output voltage. Vout comparison circuitry 206 receives the output voltage from regulator 202, compares the output voltage to the voltage reference, and outputs a Vout comparison signal, Compout. In one embodiment, the Vout comparison signal may be a logic high level (e.g., 1) or a logic low level (e.g., 0). For example, the Vout comparison signal may be a logic low level if the output voltage is greater than the reference voltage, and a logic high level if the output voltage is less than the reference voltage.

Duty cycle determination circuitry 208 receives the Vout comparison signal and the slope comparison signal and selects a signal with a duty cycle. In one embodiment, the combination of the four different values of the Vout comparison signal and the slope comparison signal may be used to select one of four duty cycles for a pre-driver signal, CLK_PRE.

Pre-driver 210 receives the pre-driver signal and controls switches in regulator 202 using the pre-driver signal. For example, switches may be alternately opened and closed based on the duty cycle of the pre-driver signal. By opening and closing the switches, control of the output voltage is provided to cause the output voltage to follow the reference voltage. As will be described in more detail below, power may be supplied to regulator 202 to increase the output voltage or may be drawn from regulator 202 to decrease the output voltage.

The regulator output current may be sensed by sensing the slope of the voltage. This reduces the phase lag that conventionally occurs when sensing the voltage to perform hysteretic control. Also, four duty cycles are used to control the supplying and drawing of current into and out of the inductor, respectively. As will be described in more detail below, by reducing the phase lag and using multiple duty cycles (e.g., 4 duty cycles), the current ripples on the inductor current are reduced and subsequently the voltage ripples on the output voltage are reduced.

Figure 3A:
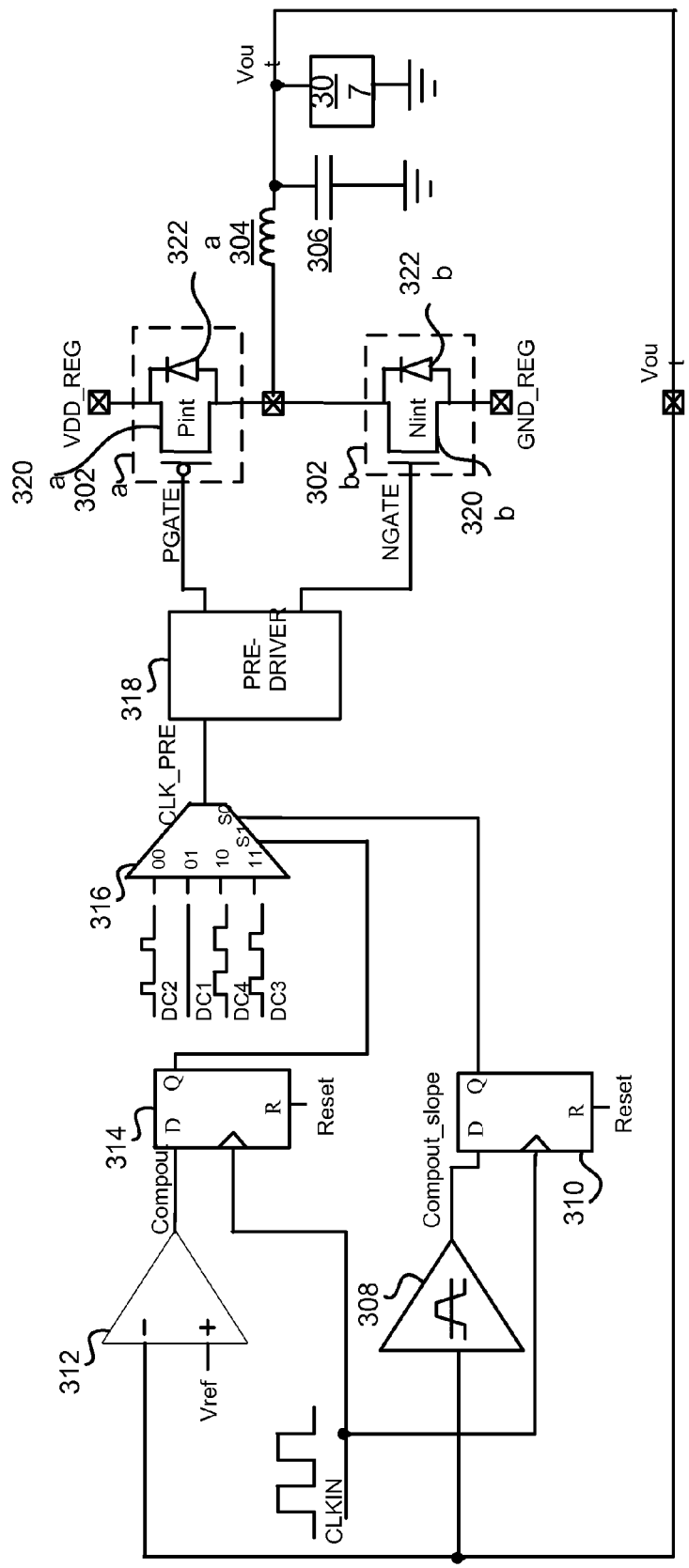
FIG. 3a depicts one implementation of system according to one embodiment.

Different implementations may be used to detect the slope of the output voltage. FIG. 3a depicts one implementation of system 200 according to one embodiment. This implementation uses instantaneous slope detection to provide hysteretic control using four duty cycles.

Regulator 202 includes an inductor 304, a capacitor 306, and a load 307. These components may be located external to an integrated circuit (IC) (e.g., off chip).

A first switch 302a and a second switch 302b are provided to couple inductor 304 and capacitor 306 to a voltage supply VDD_REG and ground GND_REG. The supply voltage VDD_REG is converted to the output voltage Vout. A person of skill in the art will appreciate the conversion of the voltage using the regulator based on the teachings and disclosure herein.

The instantaneous slope of the output voltage may be detected by a comparator 308. Comparator 308 is configured to determine whether the slope of the output voltage is positive or negative. Comparator 308 outputs the slope comparison signal based on the detected slope. For example, a logic low level is output when the slope is detected as negative and a logic high level is output when the slope is detected as positive. In one embodiment, instantaneous slope detection compares the current voltage information and slightly delayed voltage information from Vout. The delay may be much smaller than one clock period, such as 1% of the clock period. When the current voltage is greater than the delayed voltage, then comparator 308 outputs a high logic level representing a positive slope. Conversely, when the current voltage is less than the delayed voltage, then comparator 308 outputs a low logic level representing a negative slope.

The slope comparison signal Compout_slope is then input into a flip-flop 310, such as a D flip-flop. Flip-flop 310 receives a clock signal, CLKIN, and outputs the slope comparison signal when clocked.

Also, the output voltage is compared to a reference voltage Vref at a comparator 312. Comparator 312 outputs the Vout comparison signal, Compout, based on the comparison. For example, if the output voltage is greater than the reference voltage, then a low logic level is output. If the output voltage is less than the reference voltage, then a high logic level is output.

A flip-flop 314, such as a D flip-flop, receives the Vout comparison signal. The clock signal CLKIN is input into clock flip-flop 314, which outputs the Vout comparison signal when clocked.

A selector 316 receives the Vout comparison signal and the slope comparison signal at terminals S1 and S0, respectively. Selector 316 selects one of four duty cycles for a pre-driver signal CLK_PRE. Although four duty cycles are provided, another number of duty cycles may be used.

In one example, if the value at inputs s1 and s0 is 00, a duty cycle of DC2 is selected. Also, for the values 01, 10, and 11, the duty cycles of DC1, DC4, and DC3 are selected, respectively. In one embodiment, the percentages for the duty cycles are where DC4>DC3>DC2>DC1, where DC1 is >=0%.

FIG. 3b shows a table 350 summarizing the values of the signals Compout, Compout_slope, and CLK_PRE according to one embodiment. At 352, when the output voltage Vout is greater than the reference voltage, a logic level 0 is output for the signal Compout. At 354, when the signal Compout_slope is 0 indicating the slope of the output voltage is a negative slope, at 356, the duty cycle DC2 is selected for the signal CLK_PRE. At 358, when the signal Compout_slope is at a high logic level indicating the slope of the output voltage is positive, at 360, the duty cycle DC1 is selected for the signal CLK_PRE.

At 362, the signal Compout is a high logic level indicating that the output voltage is less than the reference voltage. At 364, if the signal Compout_slope is a low logic level indicating the slope of the output voltage is negative, at 366, the duty cycle DC4 is selected. At 368, if the signal Compout_slope is a high logic level indicating the slope of the output voltage is positive, at 370, the duty cycle DC3 is selected.

Referring back to FIG. 3a, a pre-driver 318 receives the pre-driver signal CLK_PRE and controls switches 302a and 302b using a PGATE and an NGATE signal. The PGATE and NGATE signal controls switches 302a and 302b based on the duty cycle of the pre-driver signal. In one embodiment, switch 302a is open when the pre-driver signal is low and closed when the pre-driver signal is high. Also, switch 302b is closed when the pre-driver signal is low and open when the pre-driver signal is high. In one embodiment, switch 302a includes a p-type transistor (Pint) 320a and a body diode 322a. Transistor 320a turns on to allow current to flow from VDD_REG to the output node Vout. Also, in one embodiment, switch 302b includes an n-type transistor (Nint) 320b and a body diode 322b. Transistor 320b turns on to allow current to flow from the output node to ground GND_REG. Transistors 320a and 320b may also be metal oxide semiconductor field effect transistors (MOSFETs), but other transistor types may be used. Also, other implementations of switches 302a and 302b may be used.

When switch 302a is closed and switch 302b is open, input power is transferred to inductor 304 and charges capacitor 306 voltage. When switch 302a is open and switch 302b is closed, power is drawn from inductor 304 to load 307 and discharges capacitor 306 voltage.

Figure 4:
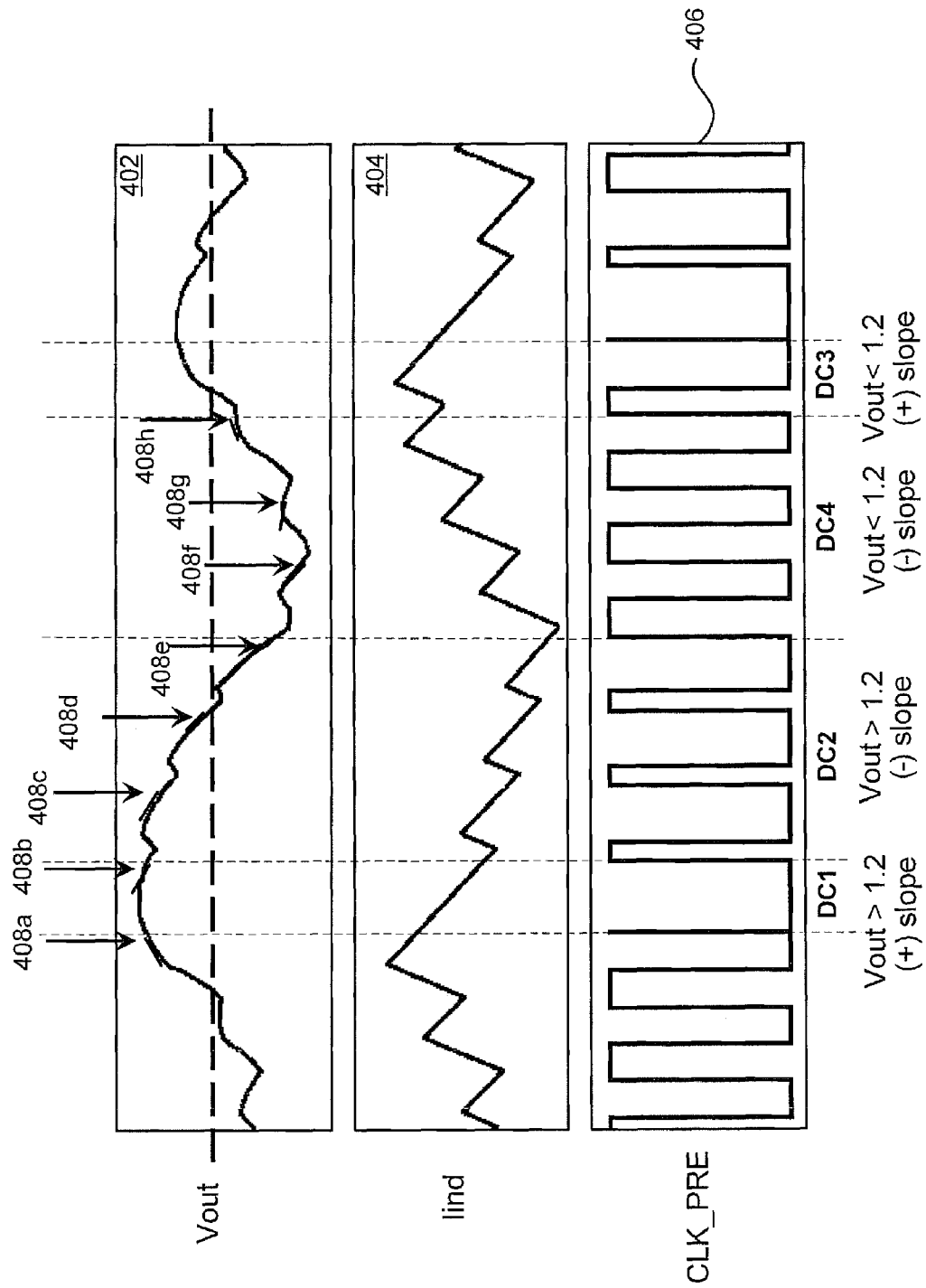
FIG. 4 shows waveforms for the implementation of FIG. 3 according to one embodiment.

FIG. 4 shows waveforms for the implementation of FIG. 3 according to one embodiment. A graph 402 shows a waveform for the output voltage (Vout), a graph 404 shows a waveform for the current through inductor 304 (Iind), and a graph 406 shows the pre-driver signal CLK_PRE.

At 408a-h, instantaneous slope detection is performed. For example, the instantaneous slope is detected at certain points based on clock signal CLKIN. In one embodiment, the instantaneous slope is detected before a ripple occurs on the output voltage. Detecting the slope when the ripple occurs may cause an error in the slope detection (e.g., a positive slope is detected when the slope should be detected as negative). For example, the ripple may occur when the inductor current switches states, that is, when the inductor current switches from being supplied to inductor 304 to being drawn from inductor 304, or vice versa.

At 408a, the slope is detected as positive and the output voltage is greater than the reference voltage. Thus, the duty cycle DC1 is selected.

At 408b, the slope is detected as negative and the output voltage is greater than the reference voltage. The duty cycle DC2 is then selected. The same is true at 408c and 408d, and the duty cycle DC2 continues to be used.

At 408e, the output voltage is below the reference voltage and the slope is negative. Duty cycle DC4 is then selected. The same is true at 408f and 408g.

At 408h, the slope is positive and the output voltage is below the reference voltage. The duty cycle DC3 is then selected.

Accordingly, when the output voltage is above the reference voltage, switch 302b is closed and switch 302a is open for more of a percentage of time using duty cycles DC1 and DC2, which subsequently discharges capacitor 306. Conversely, when the output voltage is below the reference voltage, the duty cycle is increased using duty cycles DC3 and DC4 and switch 302a is closed and switch 302b is open for a longer period of time, which subsequently charges capacitor 306.

As can be seen, duty cycles DC1 and DC2 are used to discharge capacitor 306 and duty cycles DC4 and DC3 are used to charge capacitor 306. As will be described below, using four duty cycles reduces the ripple on the inductor current and the output voltage.

Figure 5:
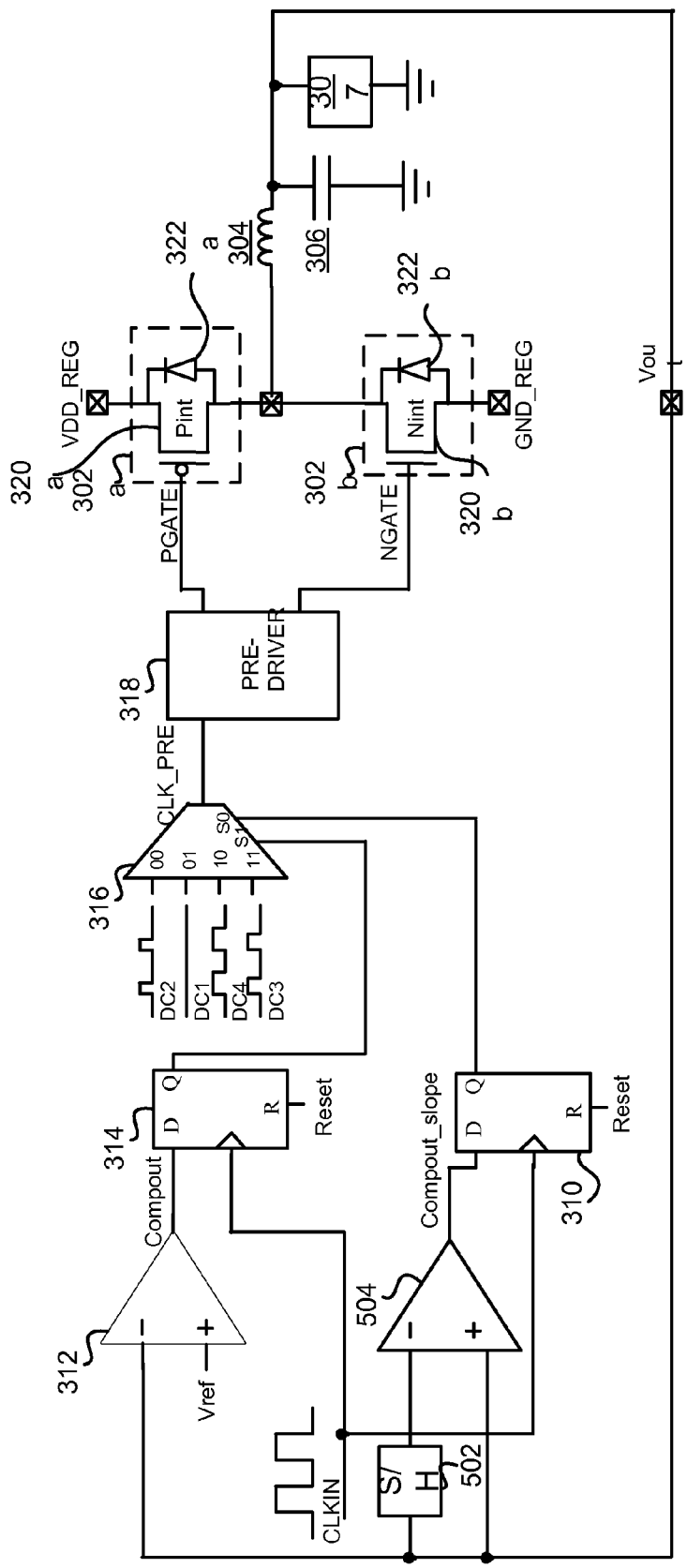
FIG. 5 shows another implementation for detecting the slope of the output voltage according to one embodiment.

Different implementations may be used to determine the slope. For example, FIG. 5 shows another implementation for detecting the slope of the output voltage according to one embodiment. The implementation uses comparison of slopes that are taken at least two cycle times.

The output voltage is received at a sample and hold device 502. Sample and hold device 502 holds a first voltage value for the output voltage. This allows for slope detection from multiple cycles. For example, the output voltage for the previous cycle is input at negative terminal of a comparator 504 and the output voltage for a current cycle is input at a positive terminal of comparator 504. These slopes are compared to determine if the slope is positive or negative. When the voltage at the positive terminal is greater than the voltage at the negative terminal, then comparator 504 outputs a high logic level representing a positive slope. Conversely, when the voltage at the positive terminal is less than the voltage at the negative terminal, then comparator 504 outputs a low logic level representing a negative slope. Comparator 504 outputs a slope comparison signal Compout_slope indicating the slope.

Figure 6:
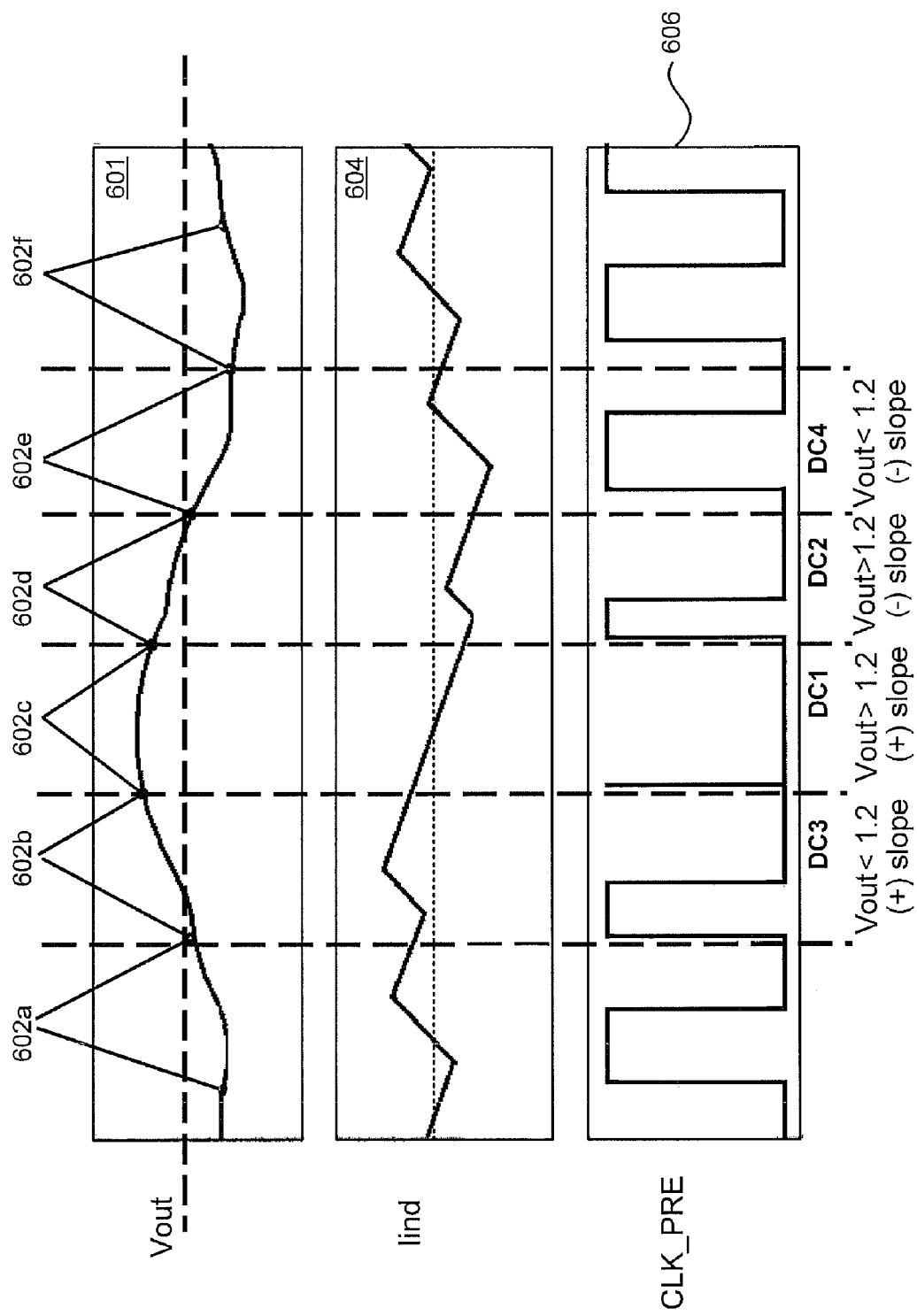
FIG. 6 shows an example of waveforms for the implementation of FIG. 6 according to one embodiment.

FIG. 6 shows an example of waveforms for the implementation of FIG. 6 according to one embodiment. A graph 601 shows a waveform for the output voltage, a graph 604 shows a waveform for the current through inductor 304, and a graph 606 shows the pre-driver signal CLK_PRE.

At 602a-602f, the slope is detected from two clock cycles. The slope may be detected before the rising edge of the CLK_PRE signal. This ensures that the slope is not detected on a ripple of the output voltage. The slope is determined by comparing a second voltage detected at a time t with a first voltage detected at a time t−1. If the second voltage is greater than the first voltage, a positive slope is determined, and if the second voltage is less than the first voltage, a negative slope is determined. As shown, duty cycles DC3, DC1, DC2, and DC4 are determined based on the slope detection at two cycles.

For example, at 602a, the second voltage detected is above the first voltage detected, and thus the slope is positive. The output voltage is below the reference voltage at the first cycle. Although the first cycle is used as the reference point for determining the duty cycle, other points may be used. The duty cycle DC3 is then selected.

At 602b, the second voltage detected is above the first voltage detected, and thus the slope is positive. The output voltage is now greater than the reference voltage. Thus, the duty cycle DC1 is selected.

At 602c, the second voltage detected is below the first voltage detected, and thus the slope is negative. The output voltage is also greater than the reference voltage. The duty cycle DC2 is then selected.

At 602d, the second voltage detected is below the first voltage detected, and thus the slope is negative. The output voltage is below the reference voltage. Duty cycle DC4 is then selected. Similar determinations can be made as described above for 602e and 602f.

The implementation shown in FIG. 5 is similar to implementation described in FIGS. 3a and 3b, except that the slope detection uses slopes detected for two cycles rather than an instantaneous slope detection.

Figure 7:
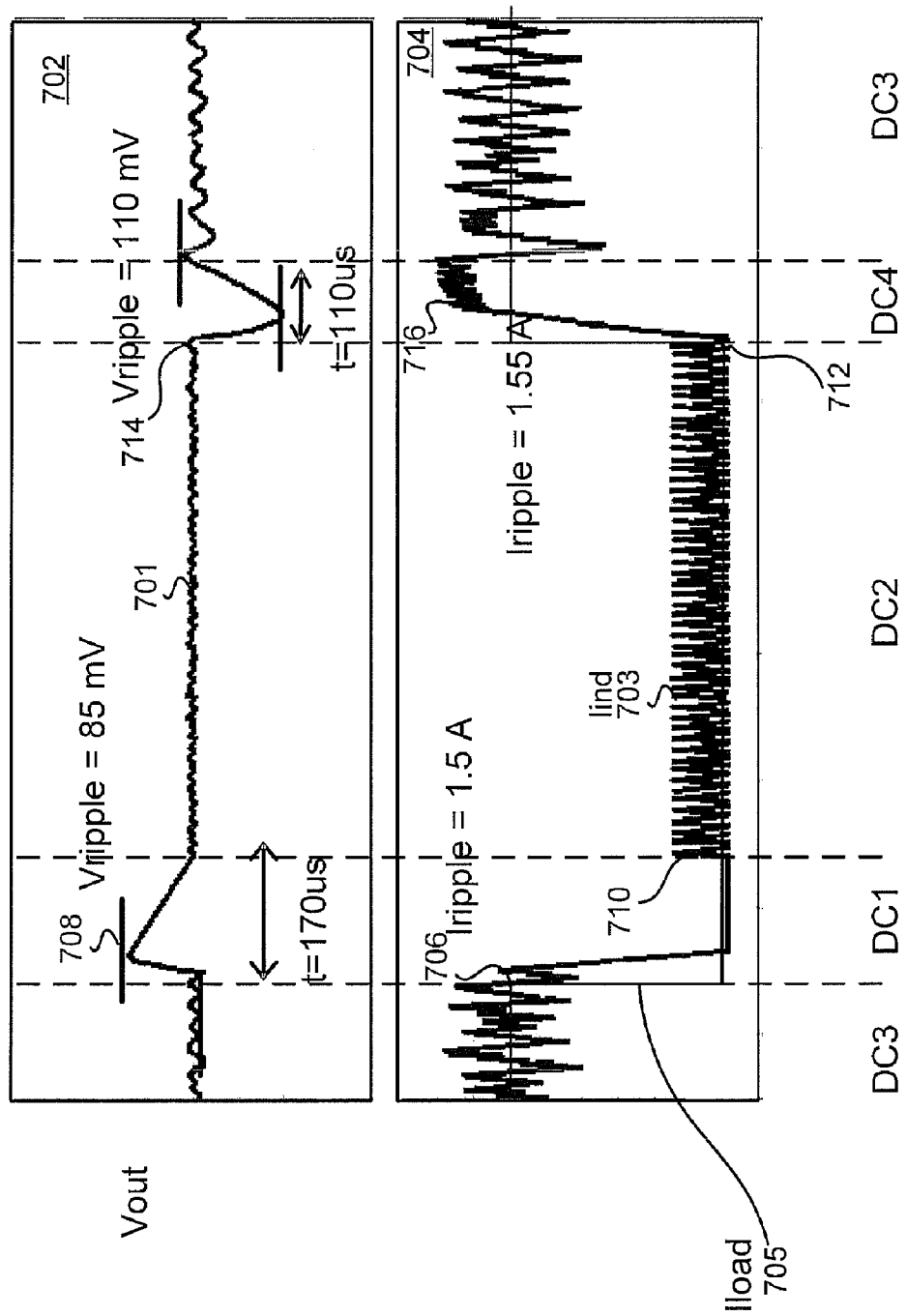
FIG. 7 shows an example of output voltage, inductor current, load current waveforms according to one embodiment.

By using four duty cycles, ripples on the output voltage and the inductor current may be reduced. FIG. 7 shows an example of output voltage, inductor current, load current waveforms during load step response according to one embodiment. A graph 702 shows a waveform 701 for the output voltage (Vout) and a graph 704 shows a waveform 703 for the inductor current (Iind) and a waveform 705 for the current through load 307 (Iload).

At 706, the current through load 307 goes from 1.2 A to 0.01 A. Regulator 202 then causes the current through inductor 304 to go from an average of 1.2 amps to an average of 0.01 amps by discharging capacitor 306. This causes a ripple in the output voltage at 708 because the current is being discharged from capacitor 306 when the current through load 307 goes to 0 A. The increase in the output voltage is due to the current still being supplied through inductor 304 thereby charging capacitor 306 (and an equivalent series resistance) while the current through load 307 is at 0 A.

Figure 1:
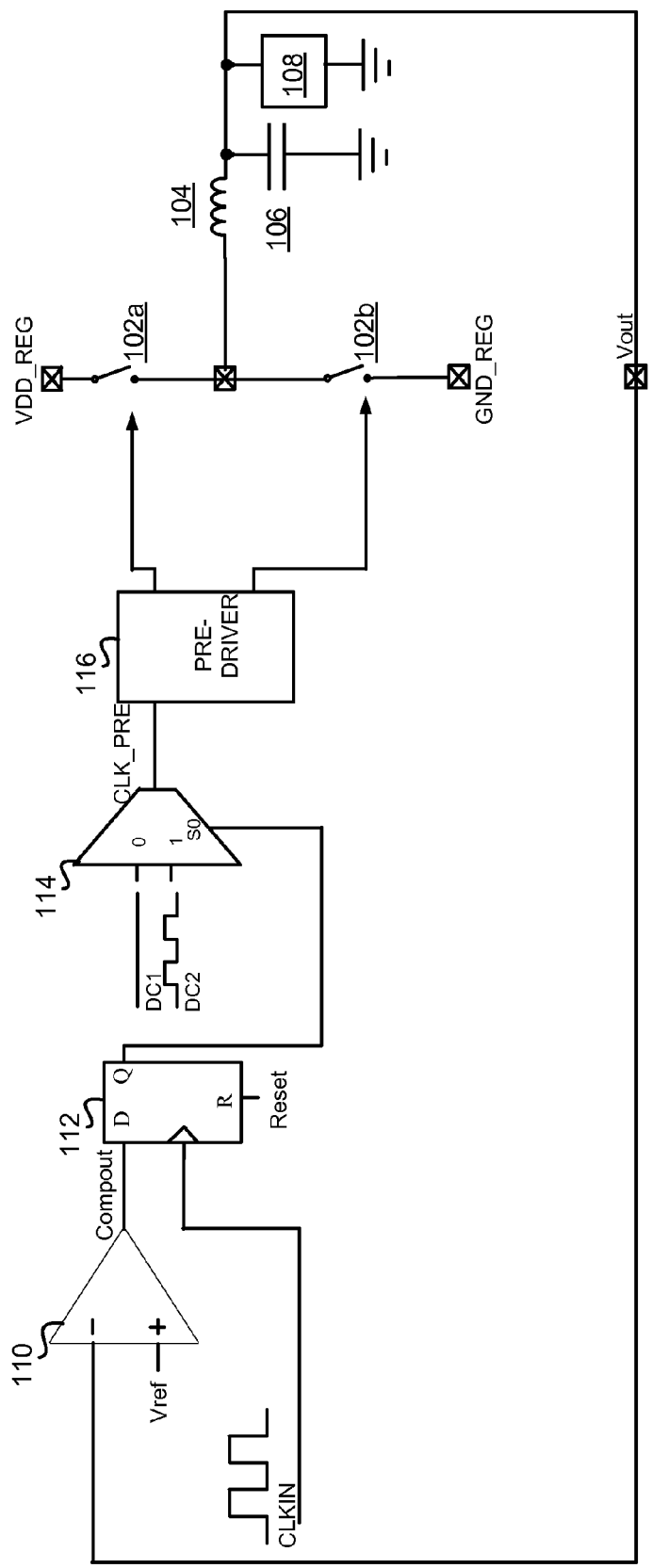
FIG. 1 depicts an example of a conventional buck regulator.

In one embodiment, the ripple is 85 millivolts and lasts for 170 microseconds. The amount of the ripple and the duration for the ripple is reduced from the conventional example in FIG. 1 because the peak inductor current is lowered. In the conventional example in FIG. 1, the only duty cycles that are used are DC1 and DC4 (shown as DC2 in FIG. 1). By including the duty cycle DC2 and DC3, a slightly lower peak current is being supplied through inductor 304 (thereby charging capacitor 306) than if only duty cycle DC1 and DC4 were being used before the current through load 307 goes low. Thus, the time that capacitor 306 takes to be discharged is lesser.

When the load current goes from low to high at 712, the high duty cycle DC4 helps to quickly charge up the inductor current to load 307 and DC3 helps to minimize the current overshoot. For example, when the load current goes from 0.01 A to 1.2 A, the duty cycle DC4 is used to quickly charge up the inductor current to load 307 and hence reduces the discharge rate of capacitor 306.

Additionally, at 716, when the output voltage slope changes to positive, DC3 is used to minimize the peak inductor current thereby minimizing the output voltage overshoot. For example, a voltage ripple is 110 millivolts for a duration of 110 microseconds occurs.

Accordingly, particular embodiments reduce the output voltage ripple and inductor current ripple using four duty cycles. Further, the current is detected using the slope of the output voltage. This reduces the phase lag that occurs when only detecting the voltage. Thus, the ripple caused by an ESR is reduced using the four duty cycles and the phase lag caused by the ESR value is also minimized because the current is detected.

Figure 8:
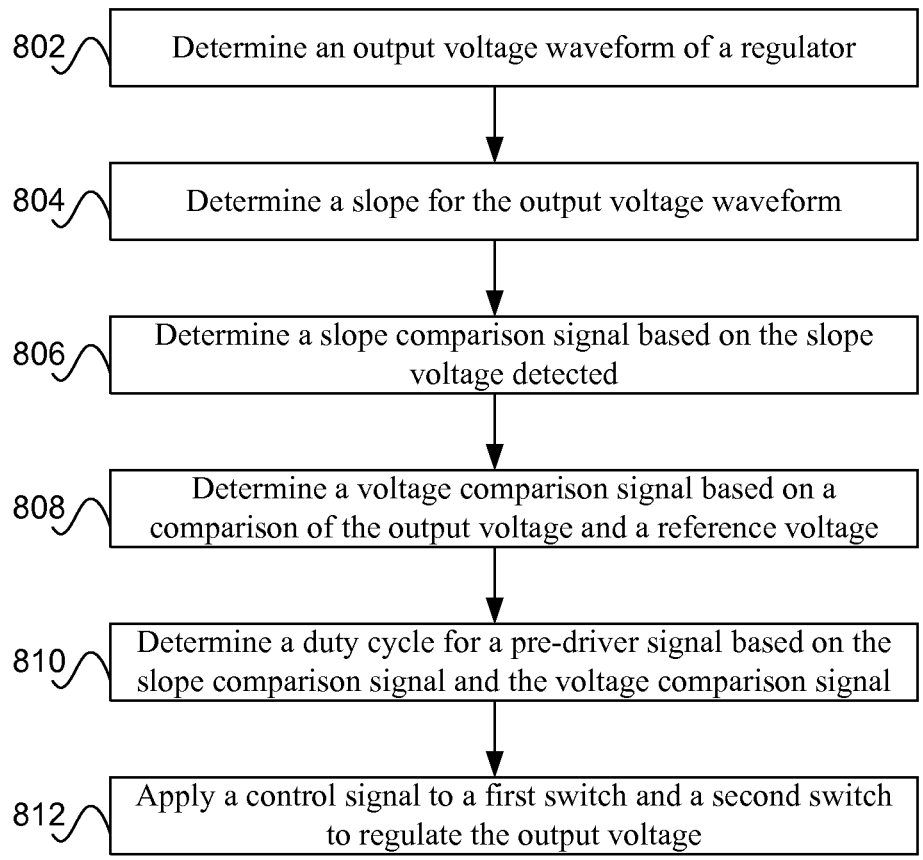
FIG. 8 depicts a method for providing hysteretic control for a regulator according to one embodiment.

FIG. 8 depicts a method for providing hysteretic control for a regulator according to one embodiment. At 802, an output voltage waveform of regulator 202 is determined.

At 804, a slope for the output voltage waveform is determined. For example, the slope may use instantaneous slope detection or may uses samples from multiple cycles for slope detection.

At 806, a slope comparison signal is determined based on the slope detected. For example, a logic low level is output if the slope is negative and a logic high level is output if the slope is positive.

At 808, a voltage comparison signal is determined based on a comparison of the output voltage and a reference voltage.

For example, a logic low level is output when the output voltage is greater than the reference voltage and a logic high level is output when the output voltage is less than the reference voltage.

At 810, a duty cycle for a pre-driver signal is determined based on the slope comparison signal and the voltage comparison signal. For example, a duty cycle out of four duty cycles is selected.

At 812, a control signal is applied to switch 302a and switch 302b based on the pre-driver signal to regulate the output voltage. For example, power is supplied to charge capacitor 306 when the output voltage is below the reference voltage and power is drawn to discharge capacitor 306 when the output voltage is above the reference voltage.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for regulating an output voltage of a regulator, the method comprising:
    comparing the output voltage of the regulator to a reference voltage;
    determining a slope of the output voltage of the regulator;
    based on (i) the comparison of the output voltage of the regulator to the reference voltage and (ii) the slope of the output voltage of the regulator, selecting a duty cycle from a plurality of duty cycles, wherein the plurality of duty cycles comprise (i) a first duty cycle, (ii) a second duty cycle, (iii) a third duty cycle, and (iv) a fourth duty cycle, and wherein selecting the duty cycle further comprises
        selecting the first duty cycle when (i) the output voltage of the regulator is greater than the reference voltage and (ii) the determined slope of the output voltage of the regulator is positive,
        selecting the second duty cycle when (i) the output voltage of the regulator is greater than the reference voltage and (ii) the slope of the output voltage of the regulator is negative,
        selecting the third duty cycle when (iii) the output voltage of the regulator is less than the reference voltage and (ii) the slope of the output voltage of the regulator is positive, and
        selecting the fourth duty cycle when (i) the output voltage of the regulator is less than the reference voltage and (ii) the slope of the output voltage of the regulator is negative; and
    based on the selected duty cycle, regulating the output voltage of the regulator.

2. The method of claim 1, wherein regulating the output voltage of the regulator further comprises:
    generating a pre-driver signal in accordance with the selected duty cycle; and
    based on the pre-driver signal, regulating the output voltage of the regulator.

3. The method of claim 2, wherein regulating the output voltage of the regulator further comprises:
    closing a first switch and opening a second switch to supply current to an output node of the regulator when the pre-drive signal is in a first state; and
    opening the first switch and closing the second switch to draw current from the output node of the regulator when the pre-drive signal is in a second state.

4. The method of claim 3, further comprising:
    while the first switch is closed and the second switch is open, supplying the current to an inductor to charge a capacitor; and
    while the first switch is open and the second switch is closed, drawing current from the inductor to discharge the capacitor.

5. The method of claim 1, wherein:
    the fourth duty cycle is greater than the third duty cycle;
    the third duty cycle is greater than the second duty cycle;
    the second duty cycle is greater than the first duty cycle; and
    the first duty cycle is greater or equal to zero.

6. The method of claim 1, wherein determining the slope of the output voltage of the regulator further comprises:
    determining a first value of the output voltage of the regulator;
    determining a second value of the output voltage of the regulator, wherein the second value is determined less than a clock cycle from when the first value is determined; and
    comparing the first value and the second value to determine the slope of the output voltage of the regulator.

7. The method of claim 1, further comprising:
    based on the comparison of the output voltage of the regulator to the reference voltage, generating a comparison signal,
    wherein regulating the output voltage of the regulator further comprises
        based on the comparison signal, regulating the output voltage of the regulator.

8. The method of claim 1, further comprising:
    based on the slope of the output voltage, generating a slope signal,
    wherein regulating the output voltage of the regulator further comprises
        based on the slope signal, regulating the output voltage of the regulator.

9. An apparatus comprising:
    a regulator configured to generate an output voltage; and
    a control circuitry coupled to the regulator, the control circuitry including
        (A) a comparison circuitry configured to compare the output voltage of the regulator to a reference voltage,
        (B) a slope detection circuitry configured to detect a slope of the output voltage of the regulator, and
        (C) a duty cycle determination circuitry configured to, based on (i) the comparison of the output voltage of the regulator to the reference voltage and (ii) the slope of the output voltage of the regulator, select a duty cycle from a plurality of duty cycles, wherein the plurality of duty cycles comprise (i) a first duty cycle, (ii) a second duty cycle, (iii) a third duty cycle, and (iv) a fourth duty cycle, and wherein the duty cycle determination circuitry is further configured to select the duty cycle from the plurality of duty cycles by selecting the first duty cycle when (i) the output voltage of the regulator is greater than the reference voltage and (ii) the determined slope of the output voltage of the regulator is positive, selecting the second duty cycle when (i) the output voltage of the regulator is greater than the reference voltage and (ii) the slope of the output voltage of the regulator is negative, selecting the third duty cycle when (iii) the output voltage of the regulator is less than the reference voltage and (ii) the slope of the output voltage of the regulator is positive, and selecting the fourth duty cycle when (i) the output voltage of the regulator is less than the reference voltage and (ii) the slope of the output voltage of the regulator is negative, wherein based on the selected duty cycle, the control circuitry is configured to regulate the output voltage of the regulator.

10. The apparatus of claim 9, wherein:

the duty cycle determination circuitry is further configured to generate a pre-driver signal in accordance with the selected duty cycle; and the control circuitry is configured to regulate the output voltage of the regulator based on the generated pre-driver signal.

11. The apparatus of claim 10, wherein the control circuitry is further configured to regulate the output voltage of the regulator by:

while the pre-drive signal is in a first state, closing a first switch and opening a second switch to supply current to an output node of the regulator; and while the pre-drive signal is in a second state, opening the first switch and closing the second switch to draw current from the output node of the regulator.

12. The apparatus of claim 11, wherein the control circuitry is further configured to regulate the output voltage of the regulator by:

while the first switch is closed and the second switch is open, supplying the current to an inductor to charge a capacitor; and while the first switch is open and the second switch is closed, drawing current from the inductor to discharge the capacitor.

13. The apparatus of claim 9, wherein:

the fourth duty cycle is greater than the third duty cycle;

the third duty cycle is greater than the second duty cycle;

the second duty cycle is greater than the first duty cycle; and the first duty cycle is greater or equal to zero.

14. The apparatus of claim 9, wherein the slope detection circuitry is further configured to detect the slope of the output voltage of the regulator by:

determining a first value of the output voltage of the regulator;

determining a second value of the output voltage of the regulator, wherein the second value is determined less than a clock cycle from when the first value is determined; and comparing the first value and the second value to determine the slope of the output voltage of the regulator.

15. The apparatus of claim 9, wherein:

the comparison circuitry is further configured to, based on comparing the output voltage of the regulator to the reference voltage, generate a comparison signal; and based on the comparison signal, the control circuitry is further configured to regulate the output voltage.

16. The apparatus of claim 9, wherein:

the slope detection circuitry is further configured to, based on detecting a slope of the output voltage of the regulator, generate a slope signal; and based on the slope signal, the control circuitry is further configured to regulate the output voltage.

* * * * *